United States Patent [19]
Kokeguchi

[11] Patent Number: 5,358,272
[45] Date of Patent: Oct. 25, 1994

[54] AIR BAG DEVICE FOR USE IN A PASSENGER'S SEAT

[75] Inventor: Akira Kokeguchi, Shiga, Japan

[73] Assignee: Takata Corporation, Tokyo, Japan

[21] Appl. No.: 34,810

[22] Filed: Mar. 19, 1993

[30] Foreign Application Priority Data

Apr. 9, 1992 [JP] Japan .................................. 4-088742

[51] Int. Cl.⁵ ............................................. B60R 21/30
[52] U.S. Cl. ..................................... 280/738; 137/74
[58] Field of Search ........... 280/728 R, 728 A, 728 B, 280/732, 736, 738, 740, 739; 137/72, 74, 526

[56] References Cited

U.S. PATENT DOCUMENTS

| | | | |
|---|---|---|---|
| 3,938,826 | 2/1976 | Giorgini et al. | 280/738 |
| 5,207,450 | 5/1993 | Pack, Jr. et al. | 280/738 |
| 5,226,670 | 7/1993 | Wright et al. | 280/732 |

FOREIGN PATENT DOCUMENTS

2257951 1/1993 United Kingdom.

*Primary Examiner*—Brian L. Johnson
*Assistant Examiner*—Paul N. Dickson
*Attorney, Agent, or Firm*—Kanesaka & Takeuchi

[57] ABSTRACT

An air bag device for use in a passenger's seat is formed of a retaining box having an opening disposed at the front face for expanding an air bag and air intake ports disposed on the lateral side for intaking air, seat-like valves disposed in the retaining box, the valves being capable of covering the lateral sides thereby closing the air intake ports and moving from the lateral side thereby opening the air intake ports, a gas generator disposed to the deep inside of the retaining box, and a lid for covering the opening of said retaining box. The valves are made of such a material as melting at a temperature lower than the igniting temperature of the gas generator.

3 Claims, 2 Drawing Sheets

AIR BAG DEVICE FOR USE IN A PASSENGER'S SEAT

FIELD OF THE INVENTION

The present invention concerns an air bag device for use in a passenger's seat mounted on a vehicle for protecting a passenger on the passenger's seat and, more in particular, it relates to an air bag device for use in a passenger's seat referred to as an aspiration type device.

DESCRIPTION OF THE RELATED ART

An air bag device for use in a passenger s seat is a device for protecting a passenger sitting on a passenger's seat, that is, on the side of a driver's seat of a vehicle against impact shocks caused, for example, upon collision of the vehicle. As is well-known, the air bag device is so constituted that a gas generator rapidly blows out a gas when a large acceleration is exerted on the vehicle, for example, upon collision of the vehicle, thereby expanding an air bag by the blown gas.

For the air bag device for use in the passenger's seat, description will now be made to an existing example referred to as an aspirating type device with reference to FIG. 2 (longitudinal cross sectional view). FIG. 2 shows an air bag 10 in an expanded state.

Before expansion, the air bag 10 is folded and contained within a retainer box 12 referred to as a container. The front face of the container 12 constitutes an opening 14 for allowing the air bag 10 to pass therethrough when the air bag 10 expands into a vehicle cabin, and the air bag 10 is secured at the base end thereof along the circumferential edge of the opening of the container 12 by way of a reinforcing plate 16 with bolts 18 and nuts 20. A gas generator 22 is attached to the rear wall of the container 12 that is opposite to the opening 14. In the existent example shown in the drawing, a generator retaining portion 24 is formed by the rear wall of the container 12 that is curved in an arcuate shape to the outside, and the gas generator 22 of a cylindrical shape fits to the generator retaining portion 24.

The gas generator 22 has a chemical substance capable of rapidly generating a gas filled in the cylindrical casing 32, and the casing 32 has jetting ports 34 disposed therein for Jetting out the gas to the inside of the container 12. A metal seal tape 38 is appended to the surface of the casing 32 so as to close the jetting ports. The seal tape 38 is torn when the gas generator 22 actuates to discharge the gas and allows the gas to jet out from the jetting ports 34. A plurality of air intake ports 40 is disposed to the upper wall and the lower wall of the container 12 respectively. Further, valves 42 are disposed to the air intake ports 40 so as to cover them from the inner surface of the container 12. The valve 42 is disposed at the base end to the container 12 by means of a volt 28 and a nut 30. The portion 42a near the base end of the valve 42 has a flexibility, so that a portion of the valve 42 toward the free end from the portion 42a near the base end can take a closed state for an air intake in which it overlaps the inner surface of the container 12 and an open state for air intake in which it is located apart from the inner surface of the container 12.

When the gas passing through the jetting ports 34 jets out into the container 12 to expand the air bag 10, an atmospheric air pushes the valve 42, passes through the air intake ports 40 and flows into the container 12. Thus, the air bag 10 expands rapidly. Since the atmospheric air is sucked in this way into the container 12, the air bag device having the air intake ports 40 is referred to as an aspirate type device.

In the air bag device for use in the passenger's seat having such a constitution, if the device encounters a fire accident, during transportation to an automobile assembling factory or during storage upon transportation, after manufacture in an air bag fabrication factory, the chemical substance in the gas generator 22 reacts to evolve the gas at a high temperature caused by the fire accident. The gas passes through the jetting ports 34 to expand the air bag 10. Since the gas pressure is extremely large, it is a worry that the air bag 10 may break through a package for transportation or storage. In view of the above, a package having high strength capable of resisting the developing force of the air bag is necessary for the transporting or storing package, which brings about a problem of increasing the transportation cost or the storage cost.

Further, also after the installation of the air bag device to an automobile, if the chemical substance in the gas generator reacts upon an accidental fire of the vehicle, it may possibly expand the air bag 10. In this instance, the container 12 is exposed to a heat of high temperature by the accidental fire and becomes weakened. Accordingly, there is a worry that the container may be broken by the expanding force of the air bag 10.

Therefore, it has been necessary to make the container 12 with such a metal material as less brittled at a high temperature or increase the thickness of the container 12.

OBJECT AND SUMMARY OF THE INVENTION

It is an object of the present invention to provide an air bag device capable of suppressing the air bag expanding force in a case if the device should encounter accidental fire during storage or transportation or after installation to an automobile.

An air bag device for use in a passenger's seat according to the present invention comprises a retaining box having an opening disposed at the front face for the expanding of an air bag and air intake ports formed on the lateral side for intaking air, seat-like valves disposed in the retaining box capable of covering the lateral side thereby closing the air intake ports and moving from the lateral side thereby opening the air intake ports, a gas generator disposed to the deep inside of the retaining box, an air bag folded and contained in the retaining box, a lid covering the opening of the retaining box, wherein the valves are made of such a material as melting at a temperature lower than the ignition temperature of the gas generator.

When the air bag device for use in the passenger's seat according to the present invention is manufactured in an air bag manufacturing factory and then transported to an automobile assembling factory or stored during transportation, the air bag device for use in the passenger's seat is placed in a packaging case. If the package encounters an accidental fire, the valve is melted at a temperature lower than the temperature at which the gas generator generates.

Further, also in a case where the air bag device for use in the passenger's seat according to the present invention encounters a vehicle fire after the installation to an automobile, the valve is melted at a temperature lower than the temperature at which the gas generator generates the gas in the same manner as described above. Accordingly, if the gas generator is ignited by the heat of the accidental fire to generate the gas, the evolved gas passes through the air intake ports and flows out of the retaining box (container). Thus, the expanding force of the air bag is reduced and a force exerted on the container is also reduced.

PREFERRED EMBODIMENT

Figure 1:
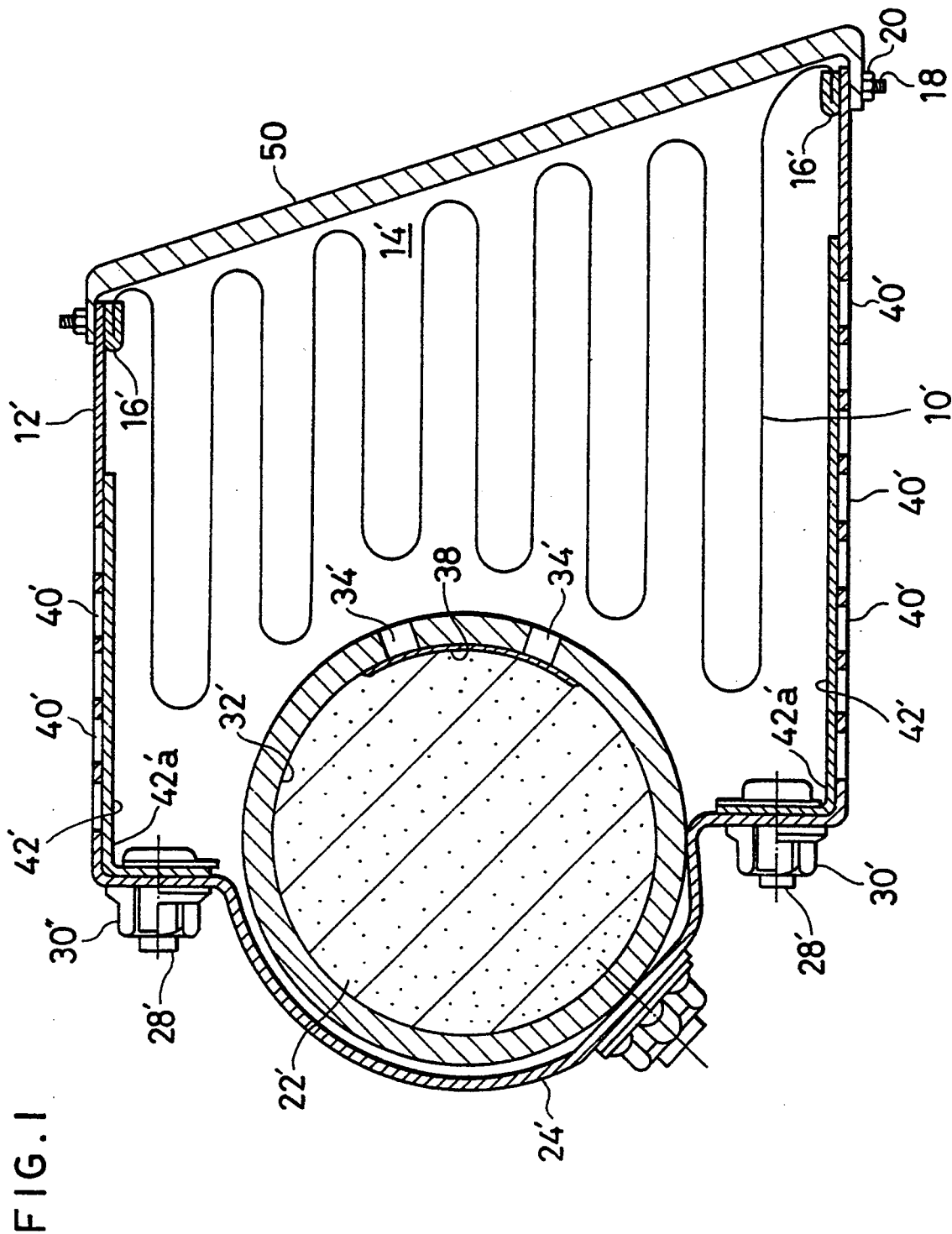
FIG. 1 is a cross sectional view of an air bag device for use in a passenger's seat according to a preferred embodiment.

Description will now be made to a preferred embodiment with reference to the drawings FIG. 1 is a cross sectional view of an air bag device for use in a passenger's seat in a preferred embodiment of the present invention. In this embodiment, a valve 42' is made of such a material that melts at a temperature lower than the igniting temperature of a gas generator 22'. More specifically, the valve 42' is made of polypropyrene (melting point at about 140° C.). Reference numeral 50 denotes a lid for covering the opening of a container 12'.

Figure 2:
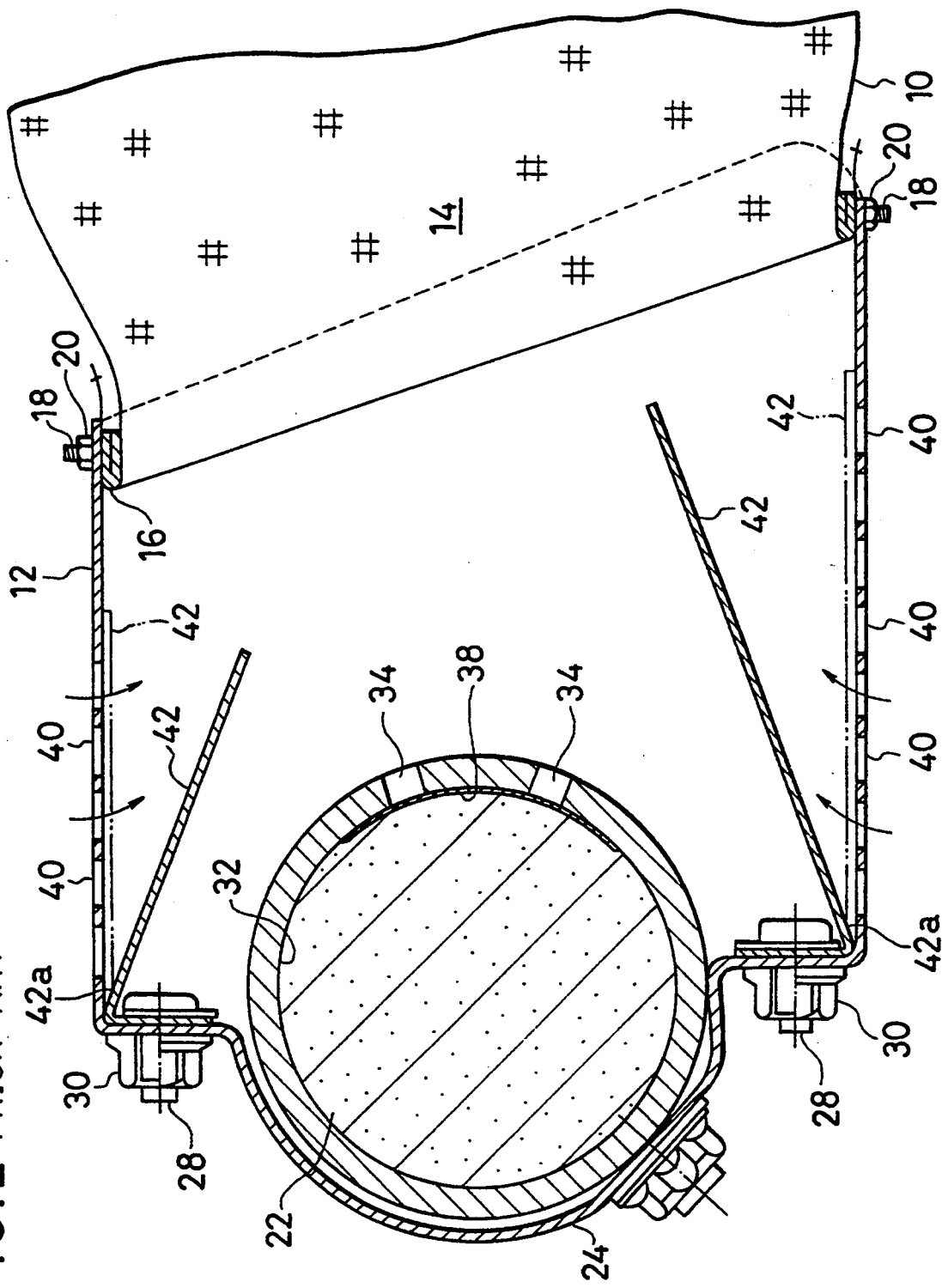
FIG. 2 is a cross sectional view of an air bag device for use in a passenger's seat in an existing embodiment.

Other components shown in FIG. 1 are identical with those in FIG. 2, in which identical reference numerals each having a superscript "'" indicate corresponding portions.

In the air bag device for use in the passenger's seat of such a construction, when a gas generator 22' is actuated upon collision of a vehicle, a chemical substance at the inside causes reaction to evolve a gas. This rapidly expands an air bag 10'. An atmospheric air passing through air intake ports 40' raises the valve 42' and flows into a container 12'.

If the air bag device for use in the passenger's seat is in an accidental fire during storage in a warehouse, in the course of transportation or after installation to an automobile, the valve 42' is melted before the actuation of the gas generator 22' to put the air intake ports 40' to an open state. Therefore, if the heat of the accidental fire reaches the igniting temperature of the gas generator to discharge a gas from the gas generator, the generated gas passes through the air intake ports 40' and flows out of the container 12'. This decreases the expanding force of the air bag 10' and also reduces the force exerted on the container.

The temperature of the gas generated by the actuation of the gas generator 22' upon collision of the vehicle is usually higher than the melting point of the valve 42'. However, since the actuation period of the gas generator 22' is extremely short, the time during which the valve 42' is exposed to the high temperature gas is short and, accordingly, the temperature of the valve 42' does not rise to the melting point thereof. Therefore, when the gas generator 22' is actuated upon collision of the vehicle, the valve 42' is not melted and the gas from the gas generator 22' expands the air bag 10'. In addition, since the valve 42' is cooled by the sucking of an external air through the air intake ports 40', by which the temperature elevation of the valve 42' is also suppressed.

As the material for the valve 42' in the present invention, nylon, polyester or the like is also suitable in addition to polypropyrene described above.

As has been described above, in the air bag device for use in the passenger's seat according to the present invention, the valve is melted when the device suffers from an accidental fire to cause a discharge of the gas from the gas generator to the outside of the retaining box, thereby reducing the expanding force of the air bag, so that even a package of low pressure resistance may suffice for transportation or storage, and the packaging cost can be decreased. In addition, if the air bag device is involved in an accidental fire, during transportation or storage, since the force exerted on the lid and the container of the air bag is reduced, they do not scatter and damage the package and, accordingly, can ensure high safety for transportation or storage. In addition, since the force exerted on the container is reduced, the choice of the metal material used for the container is increased and the wall thickness of the container can be reduced as well.

What is claimed is:

1. An air bag device for use in a passenger's seat comprising:

a retaining box having a front face, lateral sides, an opening disposed at the front face, and air intake ports formed in the lateral sides of said retaining box, a gas generator disposed in the retaining box at a side opposite to the front face, an air bag folded and contained in the retaining box between the gas generator and the opening, a lid for covering the opening of the retaining box, and valves disposed in said retaining box for covering said lateral sides to close said air intake ports, said valves being formed of a material with a melting point temperature lower than an igniting temperature of said gas generator by heat so that when the gas generator is actuated upon detection of a predetermined deceleration, gas from the gas generator enlarges the air bag together with air passing through the air intake ports while allowing the valves to move to an inside of the retaining box without melting of the valves, and when heat is applied to the air bag device, the valves melt before the gas generator is actuated by the heat to thereby allow the gas from said gas generator to discharge through said air intake ports.

2. An air bag device as claimed in claim 1, wherein temperature of the gas generated by the gas generator is higher than the melting point of the valves, said valves being cooled by air passing through the air intake ports.

3. An air bag device as claimed in claim 2, wherein the material with the melting point temperature lower than the igniting temperature of the gas generator by heat is selected from the group consisting of polypropyrene, nylon and polyester.

* * * * *